United States Patent
Kirochko et al.

(10) Patent No.: US 6,355,305 B1
(45) Date of Patent: Mar. 12, 2002

(54) WATER-BORNE FLUOROELASTOMER COATINGS AND CURED FILMS THEREFROM

(75) Inventors: Pavel Kirochko, Bolivar; James G. Kreiner, North Canton, both of OH (US)

(73) Assignee: Lauren International, Inc., New Philadelphia, OH (US)

( * ) Notice: Subject to any disclaimer, the term of this patent is extended or adjusted under 35 U.S.C. 154(b) by 0 days.

(21) Appl. No.: 09/655,247

(22) Filed: Sep. 5, 2000

Related U.S. Application Data

(63) Continuation of application No. 09/216,905, filed on Dec. 21, 1998, now Pat. No. 6,133,373.

(51) Int. Cl.[7] .............................. B05D 3/02; B32B 9/04; B32B 27/26; B32B 27/30
(52) U.S. Cl. .................... 427/387; 427/372.2; 428/447; 428/522
(58) Field of Search .......................... 427/387; 428/447, 428/522

(56) References Cited

U.S. PATENT DOCUMENTS

| | | | |
|---|---|---|---|
| 3,886,108 A | 5/1975 | Snow, Jr. .................... | 260/29.6 |
| 3,962,169 A | 6/1976 | Arruda et al. .............. | 260/29.6 |
| 4,225,482 A | 9/1980 | Ferren et al. ............... | 260/29.6 |
| 4,323,603 A | 4/1982 | Close .......................... | 524/545 |
| 4,339,553 A | 7/1982 | Yoshimura et al. .......... | 524/544 |
| 4,343,841 A | 8/1982 | Close .......................... | 427/386 |
| 4,347,268 A | 8/1982 | Close .......................... | 427/385.5 |
| 4,347,277 A | 8/1982 | Slama et al. ................. | 428/215 |
| 4,421,878 A | 12/1983 | Close .......................... | 523/454 |
| 4,423,183 A | 12/1983 | Close .......................... | 524/546 |
| 4,447,478 A | 5/1984 | Close .......................... | 427/407.1 |
| 4,504,528 A | 3/1985 | Zucker et al. ............... | 427/389.8 |
| 4,555,543 A | 11/1985 | Effenberger et al. ......... | 524/520 |
| 4,560,737 A | 12/1985 | Yamamoto et al. ............ | 527/72 |
| 5,008,327 A | 4/1991 | Shirai et al. ................. | 524/544 |
| 5,061,739 A | 10/1991 | Shimizu ...................... | 523/213 |
| 5,091,460 A | 2/1992 | Seto et al. ................... | 524/492 |
| 5,194,335 A | 3/1993 | Effenberger et al. ......... | 428/421 |
| 5,712,335 A | 1/1998 | Tsuda et al. ................. | 524/269 |
| 5,854,342 A | 12/1998 | Kirochko et al. ............ | 524/805 |
| 5,858,467 A | 1/1999 | Lenti et al. .............. | 427/385.5 |
| 5,960,245 A | 9/1999 | Chen et al. .................. | 399/333 |

OTHER PUBLICATIONS

Dupont Vitron® Bulletin, No. 5, Apr., 1961.
"Fluoroelastomer Films: New Solutions for Old Problems" by Jon Mennough, *Rubber World*, Dec., 1983.
"Fluoroelastomer Coating Halts Corrosion of High Alloy Expansion Joint" by York and Wickersham, *Chemical Processing*, Apr., 1987.
"Product Information", catalog of Ausimont USA, Inc.

*Primary Examiner*—Tae H. Yoon
(74) *Attorney, Agent, or Firm*—Renner, Kenner, Greive, Bobak, Taylor & Weber

(57) ABSTRACT

A water-borne fluoroelastomer composition comprising an aqueous dispersion of a fluoroelastomer polymer, from about 2 to about 30 parts by weight per one hundred parts by weight of polymer of a curative system, said curative system having been formed by blending from about 6 to about 94 parts by weight of a stabilized siloxane and from about 94 to about 6 parts by weight of a non-stabilized silane, where said stabilized siloxane and said non-stabilized silane total about one hundred parts by weight of the curative system, from 0 to about 40 parts by weight of an additive filler per one hundred parts by weight of polymer, and sufficient water to provide a composition having a solids content of from about 10 to about 80 percent by weight of the total composition.

20 Claims, No Drawings

WATER-BORNE FLUOROELASTOMER COATINGS AND CURED FILMS THEREFROM

This application is a continuation of U.S. Ser. No. 09/216,905, filed on Dec. 21, 1998, now U.S. Pat. No. 6,133,373.

TECHNICAL FIELD

The present invention is generally directed toward fluoroelastomer coating compositions and coatings and cured films therefrom. More particularly, the present invention is directed toward water-borne fluoroelastomer compositions having a technologically useful pot life, and that give rise to films having improved physical properties including adhesion and strength. Specifically, the water-borne fluoroelastomer coatings of the present invention contain a novel curative system that includes a blend of a stabilized siloxane curative with a non-stabilized silane curative.

BACKGROUND OF THE INVENTION

Fluoroelastomer coating compositions are well known. They typically comprise copolymers of vinylidene fluoride and hexafluoropropylene or terpolymers of vinylidene fluoride, hexafluoropropylene and tetrafluoroethylene.

Fluoroelastomers are well known for their heat, weather, solvent and chemical resistance. Furthermore, cured fluoroelastomer films typically exhibit good mechanical properties and adhere to a variety of surfaces. As a result of these properties, fluoroelastomer coating compositions are applied to protect a variety of surfaces including metals, plastics, rubbers, concrete, glass and the like.

Heretofore in the art, fluoroelastomer coating compositions have been applied by using organic solvent systems. Typical solvent systems employed ketones or ethers. Such solvents, however, are hazardous to use inasmuch as they are flammable, toxic, and volatile. Moreover, growing environmental concern over the use of such volatile organic compounds restricts the use of such compounds in various areas of the country. Finally, the pot life of the fluoroelastomer coating compositions employing such solvents is generally only a few hours. Pot life, as it will be used herein, refers to the time required for the fluoroelastomer coating composition to begin gelation.

Water-borne fluoroelastomer coating compositions are also known. For example, DuPont de Nemours Company, of Wilmington, Del. teaches aqueous dispersions of their fluoroelastomer, VITON®, with a polyamine curing agent. The pot life of such dispersions, however, is relatively short, generally only 2 to 5 days. Ausimont U.S.A. also teaches aqueous dispersions employing their fluoroelastomer, TECNOFLON®, with aliphatic amines as curing agents. As with the dispersions taught by DuPont, those employing aliphatic amines also have a relatively short pot life, on the order of only 3 to 5 days.

U.S. Pat. No. 4,399, 553 also teaches a water based fluoroelastomer coating composition containing partially or completely hydrolyzed aminosilane compounds, with or without additional amine compounds, as curing agents. These aqueous dispersions are taught to have a pot life of up to one month at 25° C.

Thus, although water based fluoroelastomer coating compositions are known, a need still exists for a water based fluoroelastomer coating composition having improved pot life, excellent stability, and which produces cured films with excellent adhesion to a wide variety of substrates.

SUMMARY OF INVENTION

It is therefore an object of the present invention to provide a fluoroelastomer coating composition as well as coatings and cured film therefrom.

It is another object of the present invention to provide a fluoroelastomer coating composition having a technologically useful pot life.

It is yet another object of the present invention to provide cured films of fluoroelastomer coating compositions having improved adhesion strength.

It is still another object of the present invention to provide fluoroelastomer coating compositions that are essentially devoid of volatile organic compounds.

Is another object of the present invention to provide cured films of fluoroelastomer coatings that exhibit good abrasion resistance.

It is yet another object of the present invention to provide fluoroelastomer coatings and cured films that have improved resistance against a wide variety of solvents and chemicals once cured.

It is still another object of the present invention to provide a fluoroelastomer coating composition that does not contain acid acceptors commonly used in fluoroelastomer compositions.

At least one or more of the foregoing objects, together with the advantages thereof over the known art relating to water-borne fluoroelastomer coating compositions and coatings and cured films therefrom, shall become apparent from the specification that follows, and are accomplished by the invention as hereinafter described and claimed.

In general the present invention provides a water-borne fluoroelastomer composition comprising an aqueous dispersion of a fluoroelastomer polymer, from about 2 to about 30 parts by weight per one hundred parts by weight of polymer of a curative system, said curative system having been formed by blending from about 6 to about 94 parts by weight of a stabilized siloxane and from about 94 to about 6 parts by weight of a non-stabilized silane, where said stabilized siloxane and said non-stabilized silane total about one hundred parts by weight of the curative system, from 0 to about 40 parts by weight of an additive filler per one hundred parts by weight of polymer, and sufficient water to provide a composition having a solids content of from about 10 to about 80 percent by weight of the total composition.

The present invention also includes a method for a fluoroelastomer film prepared by a process comprising the step of curing a water-borne fluoroelastomer composition of matter with a curative system that includes a mixture of a stabilized siloxane and a non-stabilized silane.

The present invention also includes a method for a fluoroelastomer film prepared by applying the composition to a substrate, wherein the fluoroelastomer composition includes an aqueous dispersion of fluoroelastomer polymer, from about 2 to about 30 parts by weight per one hundred parts by weight of polymer of a curative system, said curative system having been formed by blending from about 6 to about 94 parts by weight of a stabilized siloxane and from about 94 to about 6 parts by weight of a non-stabilized silane, where said stabilized siloxane and said non-stabilized silane total about one hundred parts by weight of the curative system, from 0 to about 40 parts by weight of an additive filler per one hundred parts by weight of polymer, and sufficient water to provide a composition having a solids content of from about 10 to about 80 percent by weight of the total composition, and curing the applied composition.

The present invention also includes a method for a water-borne fluoroelastomer composition comprising an aqueous dispersion of a fluoroelastomer polymer, from about 2 to about 30 parts by weight per one hundred parts by weight of polymer of a curative system, said curative system comprising a mixture of a stabilized siloxane and non-stabilized silane, from 0 to about 40 parts by weight of an additive filler per one hundred parts by weight of polymer, and sufficient water to provide a composition having a solids content of from about 10 to about 80 percent by weight of the total composition.

PREFERRED EMBODIMENT FOR CARRYING OUT THE INVENTION

It has now been discovered that improved fluoroelastomer coating and cured fluoroelastomer films can be obtained from water-borne fluoroelastomer coating compositions containing a novel curative system. By water-borne, it is meant that the compositions are based on aqueous dispersions or latices of fluoroelastomer polymers. More specifically, it has been found that the use of the novel curative system of this invention provides for fluoroelastomer compositions having a useful pot life that yields coatings and cured films having improved properties over those coatings and films prepared from compositions that do not employ the novel curative. Accordingly, the present invention is generally directed toward water-borne fluoroelastomer compositions that include fluoroelastomer polymers, a novel curative system, and optional fillers, as well as coatings and cured films prepared from this water-borne fluoroelastomer composition.

Fluoroelastomers that can be cured by the novel curative system of the present invention include any of those obtained from copolymerizable fluorine containing monomers, but preferably include copolymers of vinylidene fluoride, and hexafluoropropylene, or terpolymers of vinylidene fluoride, hexafluoropropylene, and tetrafluoroethylene. Other examples of fluoroelastomers include those modified with monomers that provide enhanced properties, e.g., copolymerization with perfluoro(methylvinylether) to improve low temperature performance. Mixtures of the above fluoroelastomers may also be employed. For purposes of this specification, the term fluoroelastomer will be used to refer to compositions of fluoroelastomers including mixtures of these fluoroelastomers.

The novel curative system of this invention includes a mixture of a water-soluble, stabilized amino-siloxane curative and a non-stabilized silane curative. For purposes of this specification, these curatives may simply be referred to as the stabilized and non-stabilized curatives, respectively, or they may be referred to stabilized siloxanes and non-stabilized silanes, respectively. Preferably, the curative system will include from about 6 to about 94 parts by weight stabilized curative and from about 94 to about 6 parts by weight non-stabilized curative, wherein the stabilized and non-stabilized curative total about 100 parts by weight. Even more preferably, the curative system will include from about 40 to about 60 parts by weight stabilized curative and from about 33 to about 67 parts by weight non-stabilized curative, wherein the stabilized and non-stabilized curative total about 100 parts by weight. It should be appreciated that the foregoing parts by weight are based upon the weight of solution of each curative. The siloxane is an aqueous solution that contains between about 20 to about 30 percent by weight solids. The silane, on the other hand, is typically a liquid at room temperature and contains essentially no water. Usually, the liquid silane contains greater than about 90 percent by weight active ingredients.

With regard to the first component of the mixture within the curative system of this invention, the water-soluble, stabilized amino-siloxane curatives include oligomeric siloxanes where the degree of polymerization of the oligomeric siloxane is essentially limited. By essentially limited, it is meant that the average degree of oligomerization of the siloxanes within an aqueous solution is about three or less.

It should be appreciated that silanes readily undergo hydrolysis in water to produce silanols. Silanols will self condense to form siloxane oligomers. This self-condensation continues beyond the soluble dimer and trimer to yield insoluble tetramers and higher, including branched and cyclic species. It is believed that these insoluble compounds deleteriously affect the ability of the siloxane oligomer to cure fluoroelastomers in water-borne coating compositions.

Without wishing to be bound by any particular theory, it is nevertheless believed that the water-soluble, stabilized amino-siloxane curatives employed in the present invention are stabilized—and thus prohibited from further polymerization or self-condensation—as a result of other constituents that are present in the aqueous solution containing the siloxanes. For example, hydrolyzed alkoxysilanes that are inhibited from further self-condensation by using an emulsifier are disclosed in U.S. Pat. No. 5,552,476. Also, European Published Application 675,128 discloses stable, water-borne silane compounds.

As noted above, the water-soluble, stabilized amino-siloxane curative is an oligomeric siloxane where the average degree of polymerization of the siloxanes is essentially limited to a trimer or less. This oligomeric trimer can be defined by the formula (I):

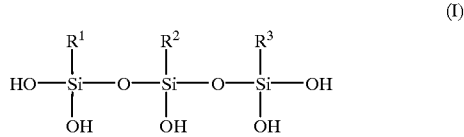

where $R^1$, $R^2$, and $R^3$ are the same or different and are selected from the group consisting of amino groups, organic moieties, and hydrogen, with the proviso that at least one of $R^1$, $R^2$ and $R^3$ contain an amino group. The functionality, size and/or configuration of each of $R^1$, $R^2$ and $R^3$, individually or in combination, must be such that the oligomer is soluble, miscible or dispersable in water or aqueous mediums, which hereinafter will be referred to as soluble or water soluble. Inasmuch as a multitude of amino-siloxanes can fall within the parameters set forth in formula (I), it should be appreciated that a mixture of the stabilized siloxanes, all generally defined by formula (I), can be employed in the present invention. The skilled artisan will readily appreciate that dimers according to formula I simply include those compounds that will include two silicon atoms as opposed to the three silicon atoms shown in Formula I. And, it should be understood that reference to water-soluble, stabilized amino-siloxane curatives or those compounds represented by the formula I will, for purposes of this specification, include all oligomeric siloxanes that are, on average, a trimer or less, and that are soluble in water.

The amino groups referred to above include primary and secondary amino groups, as well as primary and secondary amine substituted organic moieties. Reference to amino groups also includes polyamino groups, which are groups that include more than two amine nitrogens, and refers to those groups than include both primary amino and secondary amino groups. Preferably, the amino groups are primary amine groups, primary amine substituted organic moieties, or polyamino substituted organic moieties.

Organic moieties refer to alkyls, alkenes and alkynes, which can be straight or branched. It is contemplated that these moieties can also be cyclic or aromatic. It should further be understood that the organic moieties can include hetero atoms, such as oxygen or sulfur, so long as the presence of these atoms does not have a deleterious affect on the oligomer or the composition of the present invention. Preferably, the organic moieties are alkyls.

Regarding the proviso that at least one of $R^1$, $R^2$, and $R^3$ contain an amino group, it is preferred that the aminosiloxane curative contain at least two reactive amine functionalities so as to best achieve crosslinking of the fluoroelastomer monomers. In other words, it is preferred that at least two of $R^1$, $R^2$ and $R^3$ contain amino groups or at least one of $R^1$, $R^2$ and $R^3$ contain a polyamino group.

Certain examples of the substituents $R^1$, $R^2$, and $R^3$ can be defined according to the following formula (II):

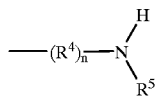

(II)

wherein $R^4$ is a divalent organic moiety as defined hereinabove, $R^5$ is selected from hydrogen and organic moieties as defined hereinabove; and n is 0 or 1. It is preferred that n is 1 and that $R^4$ is an alkyl. It should be understood that where $R^1$, $R^2$, or $R^3$ are hydrogen, formula (II) is not representative. And, it should be understood that formula (II) is not representative of substituents that contain more than one amine nitrogen, although these substituents are contemplated by this invention.

Those skilled in the art, without undue experimentation, can readily determine the maximum size and/or appropriate configuration of substituents $R^1$, $R^2$, and $R^3$ that is permissible without rendering the oligomer insoluble in aqueous media. It should be understood that the size of the substituent refers to the number of carbon atoms therein.

Although the stabilized curatives of this invention are not limited to any particular size and/or molecular weight, it is believed that each of $R^1$, $R^2$ and $R^3$ can include up to about 6 carbon atoms without rendering the molecule insoluble. The solubility of the curative, of course, will improve with fewer carbon atoms, as well as with the addition of substituents such as nitrogen and oxygen atoms. The amount of branching will also affect the solubility. Thus, the skilled artisan may be able to synthesize larger molecules by adding other substituents and/or changing the chemical structure of $R^1$, $R^2$ or $R^3$. Furthermore, although the size of any given substituent, e.g. $R^1$, can fluctuate based on the size of the complementary substituent groups, e.g. $R^2$ and R3, it is believed, and thus preferred, that the oligomers employed in the present invention contain less than about 20 total carbon atoms, more preferably less than 15 total carbon atoms, and even more preferably less than 12 total carbon atoms. Again, it should be understood that larger molecules, so long as they are soluble, are contemplated.

A water-soluble, stabilized amino-siloxane that is useful in practicing the present invention is the diamino siloxane sold by Sivento Inc. of Piscataway, N. J., under the name HYDROSIL® 2776. It is believed that this curative is hydrolyzed, terminated and stabilized, and therefore is essentially limited to trimers or smaller. Another example of a stabilized siloxane is HYDROSIL® 2775, which is also sold by Sivento. This is a triamino siloxane that is hydrolyzed, terminated and stabilized. It should be appreciated that although HYDROSIL® 2775 and 2776 are examples of preferred embodiments, any stabilized amino or polyamino siloxane meeting the above criteria can be used.

Turning now to the second component of the curative system of this invention, the non-stabilized curatives are preferably amino-silane compounds. These amino silanes should contain at least one amine nitrogen, but can also include more than one amine nitrogen. As discussed above, when placed in an aqueous environment, these silanes will ultimately form siloxane oligomers and polymers. These amino-silane compounds can be defined by the formula (III):

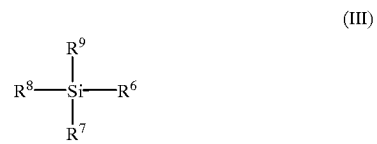

(III)

where $R^6$ is an amino group, and $R^7$, $R^8$, and $R^9$ are independently selected from hydroxyl group, hydrogen, halogen, amino groups, and organic moieties. Preferably, at least one of $R^7$, $R^8$, and $R^9$ are oxygen. The amino groups and organic moieties refer to the same groups that are more specifically defined above for $R^1$, $R^2$, and $R^3$. Useful organic moieties include alkyl groups, hydroxy groups, alkoxy groups, substituted alkoxy groups, acyloxy groups, hydroxy alkoxy groups, epoxy groups, and the like. These groups preferably contain between 1 and about 20 carbon atoms, more preferably between 1 and about 12 carbon atoms, and even more preferably between 1 and about 5 carbon atoms.

Some examples of non-stabilized, amino-silane curatives known in the art include, without limitation:
γ-aminopropyltriethoxysilane,
N-β-aminoethyl-γ-aminopropyltrimethoxysilane,
γ-aminopropyltrimethoxysilane,
γ-(β-aminoethyl)aminopropylmethyldimethoxysilane,
trimethoxysilylpropyldiethylenetriamine, The preferred amino-silanes include γ-aminopropyltriethoxysilane, N-β-aminoethyl-γ-aminopropyltrimethoxysilane, and Trimethoxysilylpropyldiethylenetriamine. These silanes are commercially available from several sources. For example, γ-aminopropyltriethoxysilane is available from Dow-Corning Corporation of Midland, Mich. under the tradename Z-6011, from Sivento, Inc. of Piscataway, N.J. under the tradename AMEO, and from Union Carbide Corporation of Danbury, Conn. under the tradename A-1100. N-β-aminoethyl-γ-aminopropyltrimethoxysilane is available from Dow-Corning under the tradename Z-6020, from Sivento under the tradename TRIAMO, and from Union Carbide under the tradename A-1120. Trimethoxysilylpropyldiethylenetriamine is available from Sivento under the tradename TRIAMO and from Union Carbide under the tradename A-1130. The foregoing list of commercially available products is by no means exhaustive and those skilled in the art can readily obtain a number of non-stabilized silanes.

It has surprisingly been found that the combination of a stabilized siloxane and a non-stabilized silane yields a curative system that is improved over curative systems that exclusively contain either a stabilized siloxane or a non-stabilized silane. Indeed, the non-stabilized silanes are ineffective as a curative in a water-borne system because they rapidly precipitate out of aqueous solution. And, the coatings and cured films prepared from compositions containing a curative of this invention are superior to those coatings and cured films prepared by using curative systems that simply include stabilized siloxanes. These advantages specifically include, but are not limited to, the ability to cure within a reasonable amount of time at room temperature and improved adhesion to a number of substrates.

It is believed that stabilized siloxanes and non-stabilized silanes in someway interact and form a product in aqueous solution. Potentially, this product could include a reaction product of the two curatives, a product formed by some forces of attraction, or simply a mixed system that is in equilibrium. Nonetheless, no such interaction may in fact exist. Because it is not desired to limit the invention to any particular theory, the combination of the stabilized siloxane curative and the non-stabilized silane will simply be referred to as a mixture, with the term referring to a simple mixture as well as all products resulting from the interaction of the curative including simple forces of attraction and chemical bonding. More generally, the stabilized siloxane and the non-stabilized silane within aqueous solution will be referred to as the curative system.

With regard to the overall fluoroelastomer composition of this invention, the composition will generally include a fluoroelastomer, from about 2 to about 30 parts by weight of the curative system per one hundred parts fluoroelastomer (phr), and optionally from about 0 to about 50 parts by weight filler phr. Preferably, the composition will include a fluoroelastomer, from about 6 to about 24 parts by weight of the curative system phr, and optionally from about 5 to about 40 parts by weight filler phr. More preferably, the composition will include a fluoroelastomer, from about 12 to about 16 parts by weight of the curative system phr, and optionally from about 10 to about 30 parts by weight filler phr.

The composition will also include water as a dispersing medium. The amount of water should be sufficient so that the solids content of the composition, i.e., the fluoroelastomer, the curative system, the optional filler and other additives, is from about 10 to about 80 percent by weight of the entire composition including the water. More preferably, the solids content of the composition should be from about 60 to about 73 percent by weight of the entire composition, and even more preferably from about 63 to about 70 percent by weight of the entire composition.

Useful fillers can include carbon black, mineral fillers (clays, synthetic silicates, whiting, barytes, and the like), color pigments (preferably inorganic and heat resistant), glass micro beads and short, chopped fibers, as well as materials to modify resistivity, such as metal powders, graphite and the like. Other examples include those materials used as fillers in rubber, plastic and coating formulations. These fillers are well known and documented in the art. In essence, any material that does not adversely affect the chemical and physical performance of the coating can be used as a filler. It should be appreciated that the presence or absence of any fillers and pigments typically does not affect the performance of the coating. Of course, the total amount of filler added will be limited by its effect on viscosity, film formation capabilities and other properties of the fluoroelastomer coating. Additional ingredients such as surfactants, viscosity modifiers and the like may be added if deemed necessary to control the liquid coating properties. Although the preferred embodiments of the present invention include a filler, it should be understood that a composition without filler falls within the scope of the present invention.

In preparing the compositions of this invention, it is preferred to prepare the curative system apart from the rest of the composition. This is preferably done by adding an appropriate amount of non-stabilized silane to the stabilized siloxane in water. This mixture may be referred to as the preblended curative system. This preblended curative system is then blended with the fluoroelastomer as well as the optional fillers and other additives by using mixing techniques that are conventional in the art. These techniques may include the use of a ball mill or other suitable mixing equipment. Indeed, the conditions of mixing are dependent upon the coating composition ingredients and can be readily determined by those skilled in the art without undue experimentation. The coating composition mixture is preferably filtered to remove any undispersed particles.

Alternatively, the curative system may be prepared in situ in certain situations; that is, the stabilized siloxane and the non-stabilized silane may be separately added to the overall composition, i.e., latex, and subsequently mixed as discussed above. When adding the curatives directly to the fluoroelastomer latex, it should be understood that the stabilized siloxane should be added first because the non-stabilized silane will undergo hydrolysis and self condense in the absence of the stabilized curative. One situation that has proved workable is the addition of HYDROSIL® 2776 followed by the addition of A-1100 directly to the latex.

The water-borne fluoroelastomer coating compositions of the present invention may be sprayed, dipped, brushed or applied in any similar fashion to form a film on the desired substrate, which can include metal, rubber, plastic, concrete or other such surfaces. There are many uses for the coatings or films of this invention that require films of varying thicknesses. Accordingly, the film thickness is chosen based upon the application. Some applications include, without limitation, fabric coatings. These fabrics can then be made into suits or tarps that can be worn used to cover certain areas during toxic waste clean-up or in a variety of other situations where harmful chemicals that do not deleteriously impact the fluoroelastomer coatings of this invention are encountered. The compositions of this invention can also be used to coat concrete in secondary-containment areas. Further, the composition can be used to coat chemical storage tanks as well as the structures that support these tanks. Still further, these compositions can be used to coat objects, like rubber rolls or printing rolls, where there is a need to dissipate electrostatic charge or insulate certain articles from electric charge. In these applications, it is desirable to add conductive fillers including carbon black and various metals or metal oxides to the coating compositions and thereby form a conductive or dielectric coating. These coatings can also be used as RFI and EMI shielding. In fact, the coatings of this invention can be used in a variety electronic applications. Still further, the coatings of this invention can used to coat certain materials and components within fuel cells and batteries. And, it should be appreciated that based upon the adhesive properties of the coatings of this invention, there are a variety of articles, including articles made of rubber, steel, plastic, and the like that can be coated with the composition of this invention. This includes coating various articles that are used in many industries, including, without limitation, under-the-hood automotive, agriculture, petro and electrochemical, construction, electric, and electronics, marine, pulp and paper, aerospace, military, and many more.

Once a film is prepared, it may be cured by room or ambient temperature or by heat curing. Where a thin film is prepared, such as a film that is about 0.25 to about 15 mils thick, a cured film results at about room temperature within about 7 to about 10 days. Where a similar thin film is prepared and subjected to heat in the range from about 60° C. to about 200° C., a cured film can be produced within minutes, such as about 5 minutes, or within a few hours, such as 4 hours, depending on the heat. In a preferred embodiment, the uncured film or coating is first dried at ambient temperatures, or in an oven at 50° C. to about 70° C., and then cured at higher temperatures, such as at about 100° C., for about one hour.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

Experiment I

Thirteen water-borne fluoroelastomer compositions were prepared. Specifically, each recipe was prepared from a fluoroelastomer latex that included 70 percent solids, i.e., 100 parts by weight rubber and 43 parts by weight water. The latex was masterbatched with about 14 parts of carbon black filler and about 3.5 parts of water. When a blended curative system was employed, the curative system was prepared by blending the respective solutions of curative together and subsequently adding the mixture to the composition. The curative system employed in each recipe is listed in Table I. The ingredients are listed in parts by weight per 100 parts by weight fluoroelastomer (phr).

TABLE I

| | Curative System Ingredients (parts by weight) | | | | | | | | | | | | |
|---|---|---|---|---|---|---|---|---|---|---|---|---|---|
| Recipe | 1 | 2 | 3 | 4 | 5 | 6 | 7 | 8 | 9 | 10 | 11 | 12 | 13 |
| Ingredient | | | | | | | | | | | | | |
| Stabilized Siloxane | 9.0 | 7.5 | 7.5 | 7.0 | 5.0 | 5.0 | 5.0 | 5.0 | 3.5 | 7.5 | 10 | 15 | 20 |
| Non-Stabilized Silane | 3.5 | 3.0 | 5.0 | 7.0 | 2.0 | 3.0 | 5.0 | 7.0 | 1.5 | — | — | — | — |

The fluoroelastomer latex that was employed included terpolymers of vinylidene fluoride, hexafluoropropylene, and tetrafluoroethylene, which was obtained from Ausimont under the tradename Tecnoflon TN Latex. The filler employed was carbon black that was obtained from Cancarb under the tradename N99IUP. The stabilized siloxane was a diamino-siloxane sold by Sivento under the tradename HYDROSIL® 2776. The non-stabilized siloxane was γ-aminopropyltriethoxysilane that was obtained from Sivento under the tradename AMEO. It should be understood that Recipes 10–13 are comparative recipes. Notably, each comparative recipe includes the same amine content as one of the other recipes within the scope of this invention, i.e., one of Recipes 1–9. Because the same amine content has been presented, a proper comparison can be made where the compositions have the same crosslinking potential.

Where feasible, a film was prepared from each recipe that was about 10 mils thick. As noted in the headings of the following tables, the properties set forth in Table II derived from films that were prepared the same day that the curative system was added to the recipe, and the film was cured at 100° C. for about one hour; the properties set forth in Table III derived from films that were prepared the same day that the curative was added to the recipe, and the film was cured for seven days at room temperature; and, the properties set forth in Table IV derived from films that were prepared ten days after the curative was added to the recipe, and the film was cured at 100° C. for one hour.

TABLE II

| | Film Prepared on Day 1 Cured at 100° C. for 1 Hour | | | | | | | | | | | | |
|---|---|---|---|---|---|---|---|---|---|---|---|---|---|
| Recipe | 1 | 2 | 3 | 4 | 5 | 6 | 7 | 8 | 9 | 10 | 11 | 12 | 13 |
| Tensile Strength (psi) | 2179 | 1541 | 1973 | 1790 | 1414 | 1440 | 1584 | 1488 | 1548 | 1218 | 1054 | 1010 | 1513 |
| Elongation at Break (%) | 332 | 415 | 394 | 301 | 203 | 494 | 374 | 263 | 734 | 670 | 527 | 427 | 235 |
| Modulus at 100% (psi) | 647 | 574 | 753 | 770 | 390 | 455 | 678 | 892 | 300 | 372 | 446 | 656 | 750 |

Based on the foregoing data in Table II, it should be evident that the use of the curative system according to the present invention provides for cured fluoroelastomer films having improved tensile strength over those films that simply employ a stabilized amino-siloxane curative. It should also be evident, based on the data in Table II, that the modulus at 100 percent, which is indicative of the completeness of the cure, was improved for those compositions that employed the curative of the present invention.

Based on the foregoing data, it should be evident that the use of the curative system of the present invention provides for compositions that have a useful pot life. This is extremely advantageous inasmuch as the water-borne systems of the prior art have a pot life that is very short.

Still further, those films prepared from Recipes 3 and 13, as well as 9 and 10, which were formed on the same day that the curative was added to the latex, and were cured and tested according to ASTM D-4541 for adhesion strength. Table VI sets forth the adhesion properties for the fluoroelastomer films in conjunction with aluminum, carbon steel, sand blasted stainless steel, and non-sand blasted stainless steel.

TABLE III

Film Prepared on Day 1 Cured at Room Temperature for 7 Days

| Recipe | 1 | 2 | 3 | 4 | 5 | 6 | 7 | 8 | 9 | 10 | 11 | 12 | 13 |
|---|---|---|---|---|---|---|---|---|---|---|---|---|---|
| Tensile Strength (psi) | 850 | 910 | 868 | 1112 | — | 821 | 1071 | 915 | — | — | — | — | — |
| Elongation at Break (%) | 1000 | 912 | 752 | 609 | — | 1073 | 828 | 618 | — | — | — | — | — |
| Modulus at 100% (psi) | 280 | 278 | 329 | 448 | — | 237 | 293 | 366 | — | — | — | — | — |

Table III shows that the properties of a film prepared according to the present invention and cured at room temperature for seven days are comparable to those similar compositions that were cured at 100° C. for about one hour. The improved usefulness of the curative system of the present invention is exemplified by the fact that the non-stabilized curative did not cure within seven days at room temperature.

TABLE IV

Film Prepared after 10 Days Cured at 100° C. for 1 Hour

| Recipe | 1 | 2 | 3 | 4 | 5 | 6 | 7 | 8 | 9 | 10 | 11 | 12 | 13 |
|---|---|---|---|---|---|---|---|---|---|---|---|---|---|
| Tensile Strength (psi) | 1950 | 1493 | 1839 | 1800 | 1420 | 1569 | 1397 | 1430 | 1490 | 1190 | 1080 | 1100 | 1480 |
| Elongation at Break (%) | 340 | 421 | 381 | 340 | 210 | 508 | 389 | 291 | 740 | 710 | 518 | 415 | 220 |
| Modulus at 100% (psi) | 630 | 563 | 749 | 782 | 380 | 471 | 643 | 808 | 310 | 380 | 455 | 660 | 740 |

The data of Table IV clearly demonstrates that the cure activity of the curative system of the present invention is not deleteriously impacted after about ten days. Indeed, the tensile strength, elongation at break, and modulus at 100 percent are comparable to those similar compositions wherein a film was prepared on the same day that the curative was added to the latex.

The compositions remaining from above Recipes were stored at room temperature and observed on a daily basis until a gelation point was achieved. Table V sets forth the approximate gelation times for each recipe.

TABLE V

| Recipe | 1 | 2 | 3 | 4 | 5 | 6 | 7 | 8 | 9 | 10 | 11 | 12 | 13 |
|---|---|---|---|---|---|---|---|---|---|---|---|---|---|
| Gelation (days) | 30 | 30 | 25 | 19 | 40 | 35 | 24 | 12 | >40 | >40 | >40 | >40 | 35 |

TABLE VI

|  | Aluminum | | Carbon Steel | |
| --- | --- | --- | --- | --- |
| Cure Conditions: | 100° C. for 1 hour | 100° C. for 1 hour plus 200° C. for 1 hour | 100° C. for 1 hour | 100° C. for 1 hour plus 200° C. for 1 hour |
| Recipe 10 Adhesion (psi) | 1300 | 1500 | 1400 | 1600 |
| Recipe 9 Adhesion (psi) | 1350 | 1450 | 1400 | 1580 |
| Recipe 13 Adhesion (psi) | 1275 | 1500 | 1400 | 1600 |
| Recipe 3 Adhesion (psi) | 1950 | 2250 | 2000 | 2280 |

|  | Stainless Steel | | | |
| --- | --- | --- | --- | --- |
|  | Sandblasted | | Not Sandblasted | |
| Cure Conditions: | 100° C. for 1 hour | 100° C. for 1 hour plus 200° C. for 1 hour | 100° C. for 1 hour | 100° C. for 1 hour plus 200° C. for 1 hour |
| Recipe 10 Adhesion (psi) | 1200 | 1500 | 900 | 890 |
| Recipe 9 Adhesion (psi) | 1180 | 1500 | 850 | 850 |
| Recipe 13 Adhesion (psi) | 1150 | 1480 | 850 | 900 |
| Recipe 3 Adhesion (psi) | 1700 | 2000 | 1600 | 1500 |

It should be evident from the data in Table VI that those recipes representing embodiments of the present invention clearly outperform those that simply employ stabilized amino siloxane as a curative.

EXPERIMENT II

Twelve water-borne fluoroelastomer compositions were prepared. Specifically, each recipe was prepared from a fluoroelastomer latex that included 70 percent solids, i.e., 100 parts by weight rubber and 43 parts by weight water. The latex was masterbatched with about 14 parts of carbon black filler and about 3.5 parts of water. When a blended curative system was employed, each curative system was prepared by blending the respective aqueous solutions of curative together and subsequently adding the mixture to the composition. The curative system employed in each recipe is listed in Table VII. The ingredients are listed in parts by weight per 100 parts by weight fluoroelastomer.

The fluoroelastomer latex that was employed included terpolymers of vinylidene fluoride, hexafluoropropylene, and tetrafluoroethylene, which was obtained from Austimont under the tradename Tecnoflon TN Latex. The filler employed was carbon black as obtained from Cancarb under the tradename N99IUP. The stabilized siloxane was a diamino-siloxane sold by Sivento, under the tradename HYDROSIL® 2776. The non-stabilized siloxane was γ-aminopropyltriethoxysilane was also obtained from Sivento under the tradename AMEO.

Where feasible, a film was prepared from each recipe that was about 10 mils thick. As noted in the headings of the following tables, the properties set forth in Table VIII derived from films that were prepared the same day that the curative system was added to the recipe, and the film was cured at 100° C. for about one hour.

TABLE VII

| Recipe | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| Ingredient | | | | | | | | | | | | |
| Stabilized Siloxane based on: | | | | | | | | | | | | |
| (γ-Aminopropyl)triethoxysilane | — | — | — | — | — | — | 8.0 | — | — | — | — | — |
| N-β-Aminoethyl-γ-aminopropyltrimethoxysilane | 7.3 | 7.3 | 7.3 | — | — | — | — | — | — | — | 7.0 | 7.0 |
| Trimethoxysilylpropyldiethylenetriamine | — | — | — | 8.0 | 8.0 | 8.0 | — | 8.0 | 8.0 | 8.0 | 7.0 | — |
| Non-Stabilized Silane: | | | | | | | | | | | | |
| (γ-Aminopropyl)triethoxysilane | — | — | — | — | — | — | — | 3.0 | 5.0 | 7.0 | — | — |
| N-β-Aminoethyl-γ-aminopropyltrimethoxysilane | 3.0 | 5.0 | 2.0 | 3.0 | 7.0 | 5.0 | 7.0 | — | — | — | — | — |
| Trimethoysilylpropyldiethylenetriamine | — | — | — | — | — | — | — | — | — | — | — | 7.0 |

TABLE VIII

| | Film Prepared on Day 1 Cured at 100° C. for 1 Hour | | | | | | | | | | | |
|---|---|---|---|---|---|---|---|---|---|---|---|---|
| Recipe | 1 | 2 | 3 | 4 | 5 | 6 | 7 | 8 | 9 | 10 | 11 | 12 |
| Tensile Strength (psi) | 2075 | 2969 | 3062 | 1537 | 1912 | 1682 | 2021 | 1404 | 1347 | 1665 | 1213 | 1035 |
| Elongation at Break (%) | 389 | 324 | 280 | 395 | 339 | 251 | 281 | 378 | 335 | 265 | 427 | 318 |
| Modulus at 100% (psi) | 507 | 883 | 1060 | 403 | 622 | 831 | 857 | 377 | 545 | 677 | 272 | 532 |
| Adhesion to Carbon Steel (psi) | 1500 | 1700 | 1800 | 1200 | 1700 | 1400 | 2400 | 1300 | 1500 | 1100 | 1450 | 1700 |

Based on the data in Table VIII, it should be evident that the use of the curative system according to the present invention provides for cured fluoroelastomer films having improved physical properties. It should also be evident, based on the data in Table VIII, that the adhesion to a carbon steel was improved as measured by the method defined in ASTM D-4541.

Based upon the foregoing disclosure, it should now be apparent that the use of the novel curative system described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, fluoroelastomers employed are not necessarily limited to those exemplified herein. Also, as noted herein, the use of a filler is optional. Thus, the scope of the invention shall include all modifications and variations that may fall within the scope of the attached claims.

What is claimed is:

1. A process for forming a fluoroelastomer film comprising the steps of:
   curing a film of a fluoroelastomer latex composition, where the fluoroelastomer latex composition is prepared by adding a curative system and a filler to an aqueous dispersion of a fluoroelastomer polymer, where said curative system is formed by combining a stabilized siloxane and a non-stabilized silane.

2. The process of claim 1, where said step of curing occurs at ambient temperature.

3. The process of claim 1, where the curative system is prepared by first blending from about 6 to about 94 parts by weight of the stabilized siloxane and from about 94 to about 6 parts by weight of the non-stabilized silane to form about 100 parts by weight of the curative system, and said step of adding including blending from about 2 to about 30 parts by weight of the curative system to the aqueous dispersion of the fluoroelastomer polymer.

4. The process of claim 1, where the fluoroelastomer is a copolymer of vinylidene fluoride and hexafluoropropylene, terpolymers of vinylidene fluoride, hexafluoropropylene and tetrafluoroethylene, or mixtures thereof.

5. The process of claim 1, where the non-stabilized silane is selected from compounds defined by the formula III:

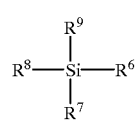

(III)

where $R^6$ is an amino group, and $R^7$, $R^8$, and $R^9$ are independently selected from hydroxyl groups, hydrogen atoms, halogen atoms, amino groups, and organic moieties.

6. The process of claim 1, where the non-stabilized silane is γ-aminopropyltriethoxysilane, N-β-aminoethyl-γ-aminopropyltrimethoxysilane, or Trimethoxysilylpropyldiethylenetriamine.

7. The process of claim 1, where the stabilized siloxane is an oligomer having an average degree of polymerization that is essentially limited to a trimer.

8. The process of claim 7, where the stabilized siloxane is selected from compounds defined by the formula I

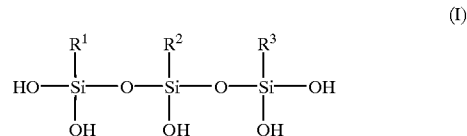

(I)

wherein $R^1$, $R^2$, and $R^3$ are the same or different and are selected from the group consisting of amino groups, organic moieties and hydrogen, with the proviso that at least one of $R^1$, $R^2$ and $R^3$ contain an amino group.

9. The process of claim 8, where at least two of $R^1$, $R^2$ and $R^3$ contain amino groups or at least one of $R^1$, $R^2$ and $R^3$ contain a polyamino group.

10. The process of claim 8, where at least one of $R^1$, $R^2$ and $R^3$ are defined by the formula (II):

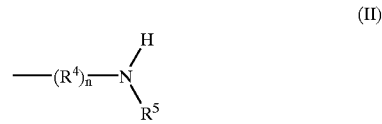

(II)

wherein $R^4$ is a divalent organic moiety, $R^1$ is a hydrogen atom, an organic moiety, or an amino group, and n is 0 or 1.

11. The process of claim 3, where the latex composition is prepared by mixing from about 0 to about 40 parts by weight filler per 100 parts by weight polymer in the aqueous dispersion of the fluoroelastomer polymer, and where the filler is carbon black, mineral fillers, clays, synthetic silicates, whiting, barytes, color pigments, glass micro beads, short, chopped fibers, metal powders, graphite or mixtures thereof.

12. The process of claim 1, where the film of a fluoroelastomer latex is formed by spraying, brushing or dipping the fluoroelastomer latex composition onto a substrate.

13. A fluoroelastomer film prepared by:
   applying a fluoroelastomer latex composition to a substrate, where the fluoroelastomer composition is prepared by mixing
   an aqueous dispersion of fluoroelastomer polymer;
   from about 2 to about 30 parts by weight of a curative system per 100 parts by weight of polymer within the dispersion, said curative system being formed by blending from about 6 to about 94 parts by weight of a stabilized siloxane and from about 94 to about 6 parts by weight of a non-stabilized silane, where said stabilized siloxane and said non-stabilized silane total about 100 parts by weight of the curative system;

from 0 to about 40 parts by weight of an additive filler per one hundred parts by weight of polymer within the dispersion; and sufficient water to provide a composition having a solids content of from about 10 to about 80 percent by weight of the total composition; and curing the applied composition.

14. The film of claim 13, where said step of curing includes heating the composition to a temperature of about 60° C. to about 200° C. for about 5 minutes to about 1 hour.

15. A fluoroelastomer film prepared by a process comprising the step of:

curing a water-borne fluoroelastomer composition of matter with a curative system that includes a mixture of a stabilized siloxane and a non-stabilized silane.

16. The film of claim 15, where the step of curing includes heating the composition to a temperature of about 60° C. to about 200° C. for about 5 minutes to about 1 hour.

17. The film of claim 15, where the step of curing includes ambient or room-temperature curing.

18. The film of claim 15, where the curative system is prepared by blending from about 6 to about 94 parts by weight of said stabilized siloxane and from about 94 to about 6 parts by weight of said non-stabilized silane to form about 100 parts by weight of the curative system, and where said step of curing employs about 2 to about 30 parts by weight of said curative system per 100 parts by weight polymer within said water-borne fluoroelastomer composition.

19. The film of claim 15, where the fluoroelastomer composition includes from about 0 to about 40 parts by weight filler per 100 parts by weight polymer within said fluoroelastomer composition, and the filler includes carbon black, mineral fillers, clays, synthetic silicates, whiting, barytes, color pigments, glass micro beads, short, chopped fibers, metal powders, graphite or mixtures thereof.

20. The film of claim 15, where the fluoroelastomer composition of matter includes sufficient water so that the composition has a solids content of from about 10 to about 80 percent by weight of the total composition.

* * * * *